No. 692,754. Patented Feb. 4, 1902.
C. R. ALSOP.
REVERSING CLUTCH.
(Application filed May 23, 1901.)
(No Model.)
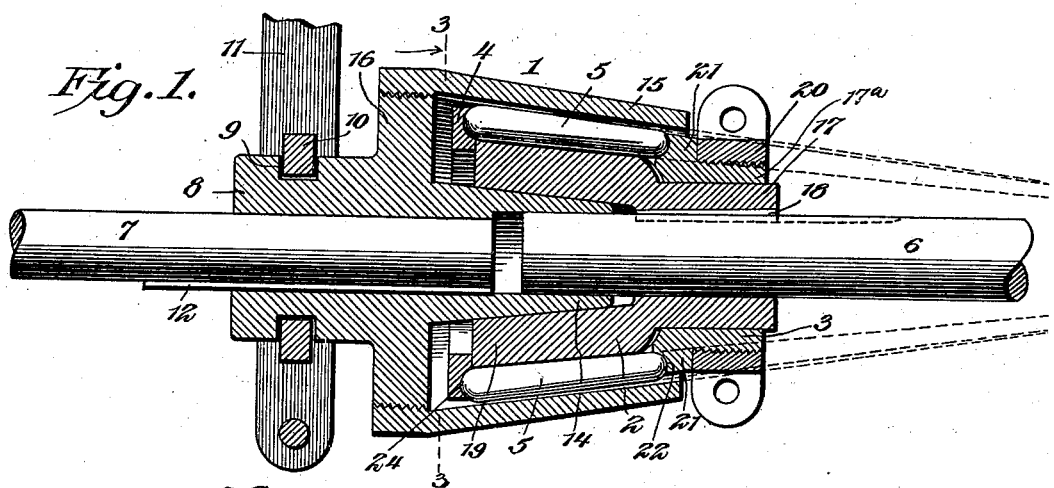
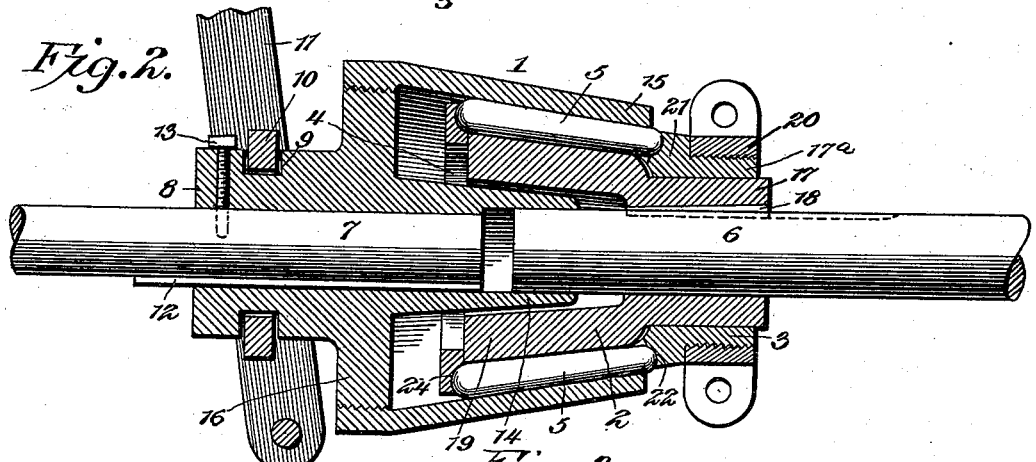
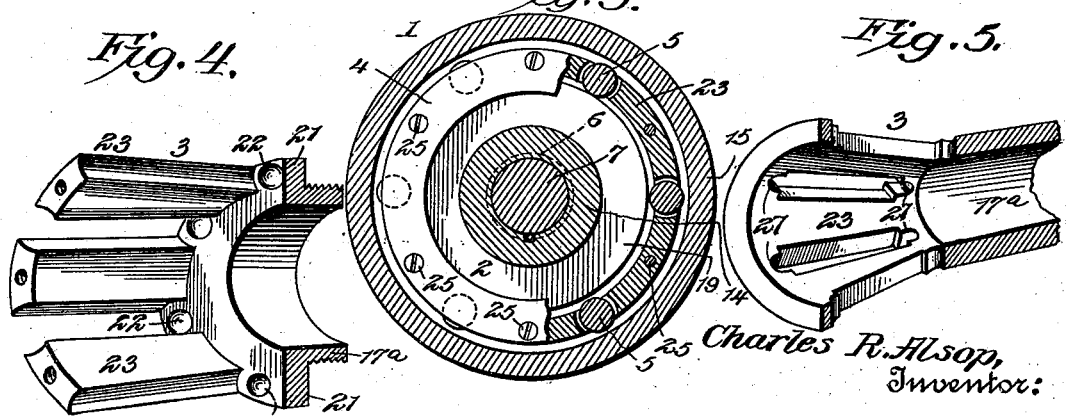
Charles R. Alsop,
Inventor:
Witnesses:
Howard D. Orr.
R. M. Elliott.
By
Attorney.
THE NORRIS PETERS CO., PHOTO-LITHO., WASHINGTON, D. C.

UNITED STATES PATENT OFFICE.

CHARLES RICHARD ALSOP, OF MIDDLETOWN, CONNECTICUT.

REVERSING-CLUTCH.

SPECIFICATION forming part of Letters Patent No. 692,754, dated February 4, 1902.

Application filed May 23, 1901. Serial No. 61,574. (No model.)

*To all whom it may concern:*

Be it known that I, CHARLES RICHARD ALSOP, a citizen of the United States, residing at Middletown, in the county of Middlesex and State of Connecticut, have invented a new and useful Reversing-Clutch, of which the following is a specification.

This invention relates to clutches, and more particularly to that class known as "reversing-clutches."

The object of the invention is in a simple and positive manner to effect reverse motion of a shaft or other piece of machinery, whether running at a high rate or low rate of speed, without jar or impact and without danger of injury to those parts of the clutch through the agency of which motion from a driving part is transmitted to a driven part; furthermore, to cause the driven part, if desired, to have a rate of speed greater or less than that of the driving part, according as may be required; furthermore, in a positive and certain manner, through the agency of the clutch, to impart direct motion to a shaft or other piece of machinery to be driven.

Generally stated, the clutch characterized by my invention comprises a male member and a female member; and the object of this invention is to provide a novel manner of mounting power-transmitting means between parts of the two members, positive contact between the two members causing direct motion and positive contact between the power-transmitting means and the two members causing reverse motion.

The invention consists, still more generally stated, in a clutch comprising a female member fixed to a shaft, a male member either fixed or movable on a shaft, but shiftable to coact with one part of the female member to cause direct motion, friction-rollers to coact with another part of the female member and with a part of the male member to cause reverse motion, and means for holding and guiding the rollers with relation to the parts with which they coact, the coacting surfaces of the different parts of the clutch being all pitched at an angle to the longitudinal axis of rotation and on lines that converge to a common center.

The invention consists, still more generally stated, in a clutch comprising a movable male member having an internal and an external taper, a fixed female member having an internal and external taper, the internal taper of the female member being normally engaged by the external taper of the male member, and tapered friction-rollers, constituting power transmitting and reversing means, interposed between the external taper of the female member and the internal taper of the male member, the rollers being free to rotate on their longitudinal axes, but held against displacement with relation to the parts with which they coact, the coacting surfaces of the parts of the clutch being all pitched at an angle to the longitudinal axis of rotation and on lines that converge to a common center.

The salient and underlying principle of this invention and that which is to be borne in mind as differentiating it from the art is that by the coaction between a plurality of cone or tapered surfaces direct and reverse motions of the part to be driven are effected in a positive and thoroughly effective manner.

Where the device is employed for connecting the sections of a two-part driving-shaft of a piece of machinery—such as that of a gas-engine, a turning-lathe, a planer, or the like—the parts of the clutch may be held in contact for transmission of power by a locking and releasing lever or by spring-pressure; but when used for connecting two sections of a propeller-shaft the thrust of the propeller may be relied upon to hold the parts of the clutch firmly locked on both motions of the propeller, although the lever or its equivalent will generally be applied.

Further and salient features of this invention will be hereinafter fully pointed out.

In the accompanying drawings, forming a part of this specification, and in which like numerals of reference indicate corresponding parts, I have illustrated a form of embodiment of my invention as applied to a propeller-shaft, it being understood that other forms of embodiment thereof may be employed without departing from the spirit of the same, and in these drawings—

Figure 1 is a view in sectional elevation, exhibiting the coöperative relation of the parts of the clutch when used for direct motion. Fig. 2 is a similar view showing the coöperative relation of the parts of the clutch when used for reverse motion. Fig. 3 is a view in transverse section taken on the line 3 3 of Fig. 1 and looking in the direction of the arrow. Fig. 4 is a fragmentary view in perspective of a portion of the cone-bearing guide or cage. Fig. 5 is a detached detail view in perspective of a form of roller-cage that may be employed in lieu of that shown in detail in Fig. 4.

Referring to the drawings, 1 designates the male member of the clutch; 2, the female member; 3, the roller-bearing guide or cage; 4, a roller-holding ring; 5, the friction-rollers; 6, in this instance, the driving-shaft, and 7, in this instance, the driven shaft. The male member 1 is provided with a hub or collar 8, having a circumferential groove 9 to be engaged by a yoke 10 of a locking and releasing lever 11, this lever being one of many forms of device that may be employed for imparting reciprocatory movement to this member. The male member has a central shaft-opening in which fits the shaft 7, a spline 12 serving to hold the male member on the shaft against independent rotation, but leaving the member free to be moved longitudinally thereon, as shown in Fig. 1, to bring the male member into engagement with the female member; but, if preferred, the male member may be rigidly held on the shaft 7 against movement, as shown in Fig. 2, wherein a bolt 13 is employed, which passes through the collar of the male member and into the shaft. In the arrangement shown in Fig. 1 movement of the lever 11 will cause the male member to slide on the shaft without imparting any motion to the shaft, while in the arrangement shown in Fig. 2 motion of the male member will cause movement with it of the shaft 7. The male member is composed of an elongated cone-shaped extension 14, constituting one of the male clutch members, hereinafter designated as the "external" taper, a hollow tapered or truncated cone-shaped collar or sleeve 15, screwed or otherwise secured to a flange 16, forming a continuation of the hub 8, constituting the other male clutch member and hereinafter designated as the "internal" taper, the pitch-lines of the internal taper of the sleeve 15 and of the external taper of the extension 14 coinciding with the taper of the rollers 5, so that when the clutch members are shifted to the position shown in Fig. 2 there will be exact contact between the said parts. Upon the shaft 6 is mounted the female member 2 of the clutch, the same comprising a hub or collar 17, secured to the shaft 6, in this instance by a key 18, and provided with a hollow truncated cone-shaped head 19, the two cone-surfaces thus presented being hereinafter designated, respectively, as the "internal" and the "external" tapers of the female member, these tapers of the female member being pitched in the same direction as the internal and external tapers of the male member. The internal taper of the head 19 of the female member is engaged by the external taper of the extension 14 of the male member, contact between these two parts being effected when direct motion is desired, as indicated in Fig. 1. Between the external taper of the female member and the internal taper of the sleeve 15 is arranged a series of friction-rollers 5, constituting in operation a power transmitting and reversing means. The rollers are tapered to cause their sides to present lines extending parallel with the internal taper of the sleeve 15 and the external taper of the female member, so that when the male member is moved to the position shown in Fig. 2 for reverse motion there will be positive and exact contact of the friction-rollers throughout their length with the internal taper of the male member and the external taper of the female member, this perfect contact between the friction-rollers and the tapers of the male member and the female member being effected by reason of the similar pitch of the lines of all these parts. It will be observed that the internal taper of the female member when engaged by the external taper of the extension 14 of the male member causes direct motion and that the external taper of the female member when engaged by the friction-rollers in connection with the internal taper of the male member causes reverse motion. This double function of a single element is of the highest importance, as it not only effects positive operation of the clutch to cause direct or reverse rotation of the shaft, but also reduces the number of parts of the device to a minimum, as gears, levers, and other devices of like character usually employed for bringing about this result are dispensed with.

The hub or collar portion 17 of the female member is mounted in and supported by the roller-bearing guide or cage 3, the collar 17$^a$ of the latter having a threaded or any other preferred form of rigid connection with a bearing or collar 20 to be secured to the boat-timbers or to the engine-frame or to other suitable support, as on the bed-plate of a lathe, a planer, or a gas-engine, the cage forming a bearing in which the female member revolves and is centered. The bearing 20 may be a split collar or clamp and may be held assembled with the cage by dowel-pins or the like, the particular manner of assembling these parts being immaterial, the point in view being to hold the cage against rotation. The form of roller guide or cage 3 shown in detail in Fig. 4 is provided with a flange 21 in diameter of a size to enter the small end of the sleeve 15 and has its inner face provided with a plurality of depressions 22, constituting bearings, these being preferably hemispherical in shape and corresponding in number to the friction-rollers, and in these depressions one end of each of the friction-rollers works, the ends of the rollers being preferably rounded to fit the depressions, thus to present a large wearing-surface. The flange carries arms 23, either integral with or secured thereto, between which work friction-rollers 5, the free ends of these arms being engaged by the roller-holding ring 4, as clearly shown in Fig. 3, the inner face of the ring being also provided with depressions 24, constituting bearings similar to those in the flange 21, in which the other ends of the friction-rollers bear, the ring 4 being held in position against the arms 23 in any preferred manner, as by screws 25. (Also shown in Fig. 3.) By the arrangement described the friction-rollers are permitted to have free motion on their longitudinal axes, but are held in position between the arms of the cage and in operative position with relation to the external taper of the female member and internal taper of the male member. By rounding the ends of the rollers to fit the bearings 22 and 24 the employment of axis-pins is rendered unnecessary, the rollers themselves forming their own journals.

Instead of constructing the cage in the manner just described—that is to say, of a plurality of separable members—I may make it of a single piece of metal, as shown in Fig. 5, this latter form of cage presenting points of advantage by reason of simplicity of construction and minimum liability to damage in use over that shown in Figs. 1 to 4. When the cage is made as shown in Fig. 5, the cone or body portion is provided with slots 26, corresponding in number to the friction-rollers, and in these slots the rollers will work in the same manner as between the arms 23, (shown in Figs. 1 to 4,) the ends of the slots being each provided with a bearing 27, in which the ends of the rollers bear, these bearings performing the same function as the bearings 22 and 24. In assembling the parts of the clutch with this latter form of cage the cage is slipped onto the female member, which has previously been fitted onto the external taper of the male member. The rollers are then placed in the slots and the sleeve 15 is slipped over all and is secured in position.

When the parts of the device are in the position shown in Fig. 1, the clutch then transmits direct motion. Should it be desired to stop, say, the propeller-shaft without stopping the engine, a slight movement of the lever 11 will draw the cone-shaped extension 14 of the male member out of contact with the internal taper of the female member, thereby breaking or destroying the frictional contact between these parts and causing the driven shaft 7 to cease rotating. Upon further outer movement of the lever 11 the friction-rollers 5 will be caused to contact with the internal taper of the sleeve 15 and the external taper of the female member, thereby imparting reverse motion to the shaft 7, the position of the parts for reverse motion being shown in Fig. 2. It will be readily appreciated that by reason of the coaction between the extension 14 of the male and the internal taper of the female member the two shafts will always be kept in exact alinement, the parts described operating to cause the shafts to be self-centering.

When the shaft 6 is the driving-shaft, the speed of the reverse motion of the shaft 7 will be less than that of the driving-shaft in proportion to the outside diameter of the portion 19 of the female member, the portion 15 of the male member, and the cross-diameters of the friction-rollers. The reason for this is that when 6 is the driving-shaft on reverse motion the power is transmitted from the portion of the clutch having the smallest diameter to the portion of the clutch having the largest diameter—that is to say, from the external taper of the female member to the internal taper of the sleeve 15—the clutch operating under these conditions, as will be apparent, in the same manner as where motion is transmitted from a small to a large gear-wheel.

When the shaft 7 is the driving-shaft, the speed of the reverse motion of the shaft 6 will be greater than that of the shaft 7, for the reason that the power is transmitted from the portion of the clutch having the greatest diameter to the portion of the clutch having the smallest diameter—that is to say, from the internal taper of the female member—the clutch operating under these conditions in the same manner as when motion is transmitted from large to a small gear-wheel.

While in the embodiment of my invention herein illustrated the female member is fixed to the shaft and the male member is movable with or on a shaft, it is to be understood that this arrangement may be reversed without departing from the spirit of my invention—that is to say, the male member may be fixed to the shaft and the female member be movable with or on a shaft.

Among the features of advantage that may be enumerated as inherent to the construction of the clutch forming this invention, the elements for effecting which results have been fully described, are: the reduction in the number of parts of the clutch to a minimum, thereby cheapening the cost of production of the device and reducing liability to damage and derangement in use; the distribution of pressure and increase in frictional contact between the parts of the clutch and the friction-rollers, this being effected by the employment of a comparatively large number of rollers and disposing these in a plane as nearly parallel with the axis of rotation as possible, whereby the wedging action of the parts is greatly augmented; the effecting of positive contact between the parts of the clutch and the friction-rollers by having the pitch-lines of all the bearing-surfaces converge to a common center, this result being attained by having the friction-rollers tapered to correspond with the pitch-lines of the other parts of the clutch; the manner of disposing and assembling the parts of the clutch to cause them to be self-centering, thereby insuring alinement of the two shaft-sections; the supporting of the friction-rollers in such manner as at once to hold the female member of the clutch and the rollers in perfect line with the shaft; the supporting of the friction-rollers in such manner as while they will freely rotate about their longitudinal axes they will be held from endwise movement, the rollers being solid and of comparatively small transverse diameter, the latter feature being of importance where the speed of the direct and reverse motions are to approximate each other as nearly as possible, as where the clutch is to be used on a propeller-shaft; the provision of means for causing the reverse motion to be greater or less than that of the direct motion, this being effected by reversing the location of the clutch member—that is to say, the placing on the driven shaft of those parts of the clutch normally carried by the driving-shaft, and vice versa—and by increasing or diminishing the transverse diameter of the friction-rollers, and the effecting by a single fixed part through coöperation with movable parts direct and reverse motion of the driven shaft, this being secured by forming the female member of the clutch with a hollow head having internal and exterior tapered or cone-shaped surfaces to be engaged, respectively, by the male part of the clutch and by the friction-rollers.

The features above enumerated are salient and appreciable from the description of the apparatus given; but it will be obvious that various and other specific advantages will accrue from the construction shown and such as will readily be appreciated by any one skilled in the art to which the invention appertains.

It will be obvious from the foregoing description that while the device of this invention is composed of but a few number of parts these are so constructed and assembled that the maximum power and efficiency is effected with a minimum liability to derangement or damage from use.

What I claim is—

1. A clutch comprising a male member, a female member, a cage, and power-transmitting means held in operative position by the cage and coacting with parts of the two members.

2. A clutch comprising a male member, a female member, a cage, and friction-rollers carried by the cage and coacting with parts of the two members.

3. A clutch comprising a male member, a female member, a cage provided with slots, and friction-rollers mounted in the slots.

4. A clutch comprising a male member, a female member, a cage provided with longitudinal slots, and friction-rollers mounted in the slots and bearing at their ends against the terminals of the slots.

5. A clutch comprising a male member, a female member, a cage provided with longitudinal slots having inset terminals, and tapered friction-rollers mounted in the slots and having rounded ends to engage the said terminals.

6. A clutch comprising a male member having an external sleeve, a female member housed within the sleeve, a cage, and friction-rollers carried by the cage and interposed between the sleeve and the female member.

7. A clutch comprising a male member having a tapered axial portion and an external sleeve, a female member housed within the sleeve and having a part to engage the said tapered portion, a cage, and friction-rollers carried by the cage and interposed between the sleeve and the female member.

8. A clutch comprising a male member, a female member, a cage in which the female member revolves and provided with longitudinal slots, and friction-rollers working in the slots.

9. A clutch comprising a male member having an external sleeve, a female member housed within the sleeve, a cage provided with longitudinal slots, and friction-rollers mounted in the slots and projecting at each side beyond the cage, whereby to engage either with the external taper of the female member or the internal taper of the sleeve.

10. A clutch comprising a male member having a tapered axial portion and an external sleeve, a female member housed between the sleeve and the axial portion, a fixed cage in which the female member revolves, and friction-rollers carried by the cage and disposed between the female member and the sleeve.

11. A clutch comprising a male and a female member, each connected with a section of a shaft, the male member having an axial portion to house the ends of both shaft-sections, whereby to hold them in alinement.

12. A clutch comprising a female member fixed to a shaft, a male member shiftable to coact with one part of the female member to cause direct motion, friction-rollers to coact with another part of the female member and with a part of the male member to cause reverse motion, and means for holding and guiding the rollers with relation to the parts with which they coact, the coacting surfaces of the different parts of the clutch being all pitched at an angle to the longitudinal axis of rotation and on lines that converge to a common center.

13. A clutch comprising a movable male member having an internal and an external taper, a fixed female member having an internal and an external taper, the internal taper of the female member being normally engaged by the external taper of the male member, and power-transmitting means interposed between the external taper of the female member and the internal taper of the male member.

14. A clutch comprising a movable male member having an internal and an external taper, a fixed female member having an internal and external taper, and friction-rollers interposed between the external taper of the female member and the internal taper of the male member.

15. A clutch comprising a movable male member having an internal and an external taper, a fixed female member having an internal and external taper, and tapered friction-rollers interposed between the external taper of the female member and the internal taper of the male member.

16. A clutch comprising a movable male member having an internal and an external taper, a fixed female member having an internal and external taper, and tapered friction-rollers interposed between the external taper of the female member and the internal taper of the male member, the rollers being free to rotate on their longitudinal axes, and means to hold the rollers against displacement with relation to the parts with which they coact.

17. A clutch comprising a movable male member having an internal and an external taper, a fixed female member having an internal and external taper, and tapered friction-rollers interposed between the external taper of the female member and the internal taper of the male member, the rollers being free to rotate on their longitudinal axes, and means to hold the rollers against displacement with relation to the parts with which they coact, the coacting surfaces of the parts of the clutch being all pitched at an angle to the longitudinal axis of rotation and on lines that converge to a common center.

18. A clutch comprising a female member, a male member, a cage, and friction-rollers carried by the cage.

19. A clutch comprising a female member, a male member, a cage on which the female member revolves, tapered friction-rollers carried by the cage, and a reversing-lever coacting with the male member to move the same to and from the female member.

20. A clutch comprising a male member, a female member, a cage carried by the female member, said cage being provided with longitudinal slots having at each end a hemispherical bearing, and tapered friction-rollers having their ends rounded to engage the bearings.

21. A clutch comprising a female member, a male member, a cage having longitudinal slots, friction-rollers mounted in the slots, and a roller-holding ring at one end of the cage, the ring and cage being provided with means to hold the rollers against displacement.

22. A clutch comprising a female member, a male member, a cage having longitudinal slots, tapered friction-rollers mounted in the slots, and a roller-holding ring at one end of the cage, the cage and the ring having depressions in which the ends of the friction-rollers work.

In testimony that I claim the foregoing as my own I have hereto affixed my signature in the presence of two witnesses.

CHARLES RICHARD ALSOP.

Witnesses:
GEO. A. COLES,
HUBERT C. DANFORTH.